MAGNETIC ANALOG SIGNAL INTEGRATOR

Filed May 10, 1965

2 Sheets-Sheet 1

INVENTORS
FREDERICK G. HEWITT
RAYMOND H. JAMES
BY Thomas J. Nikolai
ATTORNEY

June 27, 1967 F. G. HEWITT ETAL 3,328,786

MAGNETIC ANALOG SIGNAL INTEGRATOR

Filed May 10, 1965 2 Sheets-Sheet 2

INVENTORS
FREDERICK G. HEWITT
RAYMOND H. JAMES

BY Thomas J. Nikolai
ATTORNEY 3,328,786
MAGNETIC ANALOG SIGNAL INTEGRATOR
Frederick G. Hewitt, St. Paul, and Raymond H. James, Bloomington, Minn., assignors to Sperry Rand Corporation, New York, N.Y., a corporation of Delaware
Filed May 10, 1965, Ser. No. 454,613
7 Claims. (Cl. 340—174)

This invention relates to the use of magnetizable memory elements as analog signal integrators and in particular to an apparatus and a method of operation of a memory element that stores discrete levels of data as a function of the degree of the partial switching of the element's magnetic flux.

In the preferred embodiment of this invention the memory device includes at least two magnetizable memory elements in which the analog signal that defines the information that is to be sampled is coupled only to a first element. A strobe signal that acts as a flux gate to the sampled information is coupled to both the first and second elements in the same magnetic sense while a sense line is coupled to both the first and second elements in an opposite magnetic sense, i.e., in a buck-out mode. A clear, or readout, signal when coupled to both the first and second elements causes the flux change in the second element to cancel, or buck-out, the flux change in the first element due to the strobe signal alone. This difference-signal is, accordingly, a function of the integral of the sampled portion of the analog signal.

The value of the utilization of small cores of magnetizable material as logical memory elements in electronic data processing systems is well known. This value is based upon the bistable characteristic of magnetizable cores which includes the ability to retain or remember magnetic conditions which may be utilized to indicate a binary "1" or a binary "0." As the use of magnetizable cores in electronic data processing equipment increases, a primary means of improving the computational speed of these machines is to utilize memory elements that possess the property of nondestructive readout, for by retaining the initial state of remanent magnetization after readout the rewrite cycle required with destructive readout devices is eliminated. As used herein, the term "non-destructive readout" shall refer to the sensing of the relative directional-state of the remanent magnetization of a magnetizable core without destroying or reversing such remanent magnetization. This should not be interpreted to mean that the state of the remanent magnetization of the core being sensed is not temporarily disturbed during such nondestructive readout.

Ordinary magnetizable cores and circuits utilized in destructive readout devices are now so well known that they need no special description herein; however, for purposes of the present invention, it should be understood that such magnetizable cores are capable of being magnetized to saturation in either of two directions. Furthermore, these cores are formed of magnetizable material selected to have a rectangular hysteresis characteristic which assures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of sufficient amplitude through the input winding in a manner so as to set up a magnetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable materials.

One technique of achieving nondestructive readout of a magnetic memory core is that disclosed in the article "The Transfluxor" Rajchman and Lo, Proceedings of the IRE, March 1956, pp. 321–332. This method utilizes a "transfluxor" which comprises a core of magnetizable material of a substantially rectangular hysteresis characteristic having at least a first large aperture and a second small aperture therethrough. These apertures form three flux paths; the first defined by the periphery of the first aperture, a second defined by the periphery of the second aperture, and a third defined by the flux path about both peripheries. Information is stored in the magnetic sense of the flux in path 1 with nondestructive readout of the information stored in path 1 achieved by coupling an interrogate current signal to an interrogate winding threading aperture 2 with readout of the stored information achieved by a substantial or insubstantial change of the magnetic state of path 2. Interrogation of the transfluxor as disclosed in the above article requires an unconditional reset current signal to be coupled to path 2 to restore the magnetic state of path 2 to its previous state if switched by the interrogate current signal.

One method of achieving a decreased magnetic core switching time is to employ time-limited switching techniques as compared to amplitude-limited switching techniques. In employing the amplitude-limited switching technique, the hysteresis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i.e., the magnetomotive force is applied for a sufficient time duration to allow the core flux density to reach a steady-state condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on readout of the stored data. Also, where the final core flux density level is limited solely by the amplitude of the applied drive field, it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by duration of the drive field. A typical cycle of opera- . according to this time-limited operation consists of lying a first drive field of a predetermined amplitude duration to a selected core for a duration sufficient place the core in one of its amplitude-limited unsat- ted conditions. A second drive field having a predeter- ed amplitude and a polarity opposite to that of the : drive field is applied to the core for a duration insuffi- it to allow the core flux density to reach an amplitude- ited condition. This second drive field places the core a time-limited stable-state, the flux density of which ess than the flux density of the second stable state mally used for conventional, or amplitude-limited op- ion. The second stable-state may be fixed in position the asymmetry of the two drive field durations and the procedure of preceding each second drive field ation with a first drive field application. Additionally, second stable-state may be fixed in position by izing a saturating first drive field to set the first stable- e as a saturated state. The article "Flux Distribution in rite Cores under Various Modes of Partial Switch- ," R. H. James, W. M. Overn and C. W. Lundberg, irnal of Applied Physics, Supplement, vol. 32, No. 3, 38S–39S, March 1961, provides excellent background terial for the switching technique utilized in the pres- invention.

The magnetic conditions and their definitions as dis- sed above may now be itemized as follows:

PARTIAL SWITCHING

*Amplitude-limited.*—Condition wherein with a constant ve field amplitude, increase of the drive field duration ll cause no appreciable increase in core flux density.

*Time-limited.*—Condition wherein with a constant drive ld amplitude, increase of the drive field duration will use appreciable increase in core flux density.

COMPLETE SWITCHING

*Saturated.*—Condition wherein increase of the drive ld amplitude and duration will cause no appreciable in- ease in core flux density.

*Stable-state.*—Condition of the magnetic state of the re when the core is not subjected to a variable mag- tic field or to a variable current flowing therethrough.

The term "flux density" when used herein shall refer to e net external magnetic effect of a given internal mag- tic state; e.g., the flux density of a demagnetized state all be considered to be a zero or minimum flux density hile that of a saturated state shall be considered to be a aximum flux density of a positive or negative magnetic nse.

The terms "signal," "pulse," etc., when used herein iall be used interchangeably to refer to the current sig- il that produces the corresponding magnetic field and the magnetic field that is produced by the correspond- g current signal.

The preferred embodiment of the present invention is oncerned with the establishment of a predeterminably ariable magnetic flux level in a magnetizable memory ement which flux level is representative of the integral f an incremental portion of a transient electrical signal. i the preferred embodiment an incremental portion of a ansient signal from a first source is gated into the iagnetic element by a strobe pulse from a second source. 'he maximum amplitude of the transient signal is mited to a level well below the reverse breakdown volt- ge of a unilateral impedance device such that the tran- ient signal alone is incapable of affecting the flux level f the magnetic element. The strobe pulse is of an ampli- ide sufficient to switch the flux state of the magnetic evice from a first saturated state to a second and oppo- ite saturated state but is of such a limited duration so as ) preclude such complete flux reversal. However, such uration is sufficient to set the flux level in an intermediate ime-limited flux state. Different incremental portions of the transient signal may be gated into the magnetic element by delaying the transient signal different time increments with respect to the strobe pulse; each different time delayed increment of the transient signal may be gated by a strobe pulse into a separate magnetic element so that each separate magnetic element stores a flux level representative of the net magnetomotive force effect of the strobe pulse and that portion of the transient signal gated by the strobe pulse.

Accordingly, it is a primary object of the present invention to provide a device and a method for the sampling of an electrical signal.

It is a further object of the present invention to provide a device and a method for the flux gating of an analog signal by a time-limited strobe pulse.

It is a further object of the present invention to provide a device and a method whereby an analog signal is sampled by a strobe pulse wherein the duration of the sampled portion of the analog signal is determined by the duration of the strobe pulse.

It is a further object of the present invention to provide a device and a method for integrating an analog signal and storing such integral in a magnetic element as a corresponding partially-switched time-limited flux level.

It is a further object of the present invention to provide a device and a method whereby an analog signal is sampled by a strobe pulse for integrating such sampled portion of such analog signal and storing such integral in a magnetic element as a corresponding partially-switched time-limited flux level.

It is a further and more general object of the present invention to provide a novel method of operating a magnetic memory element as an integrator of a sampled portion of an analog signal.

These and other more detailed and specific objects will be disclosed in the course of the following specification, reference being had to the accompanying drawings, in which.

Figure 1:
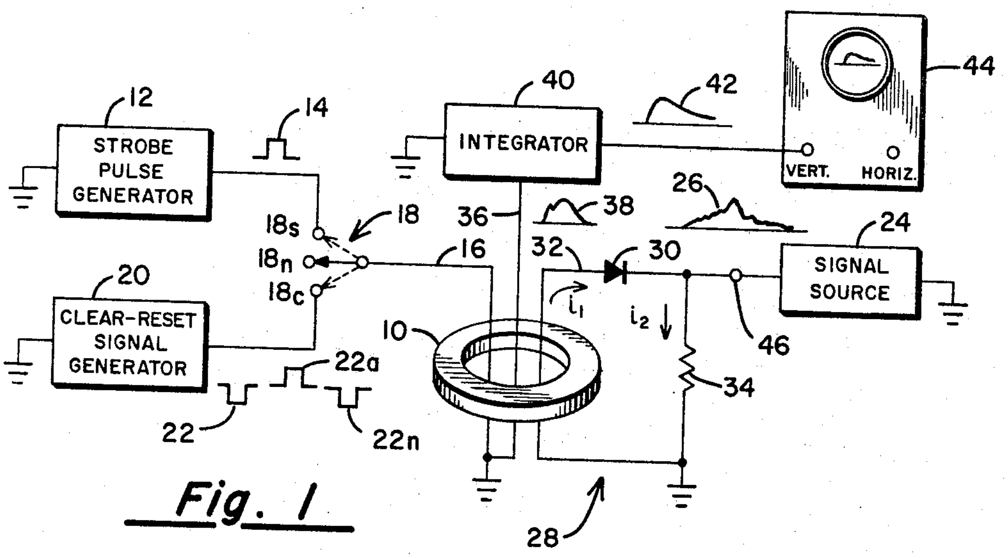
FIG. 1 is an illustration of a circuit utilizing the present invention.
Figure 2:
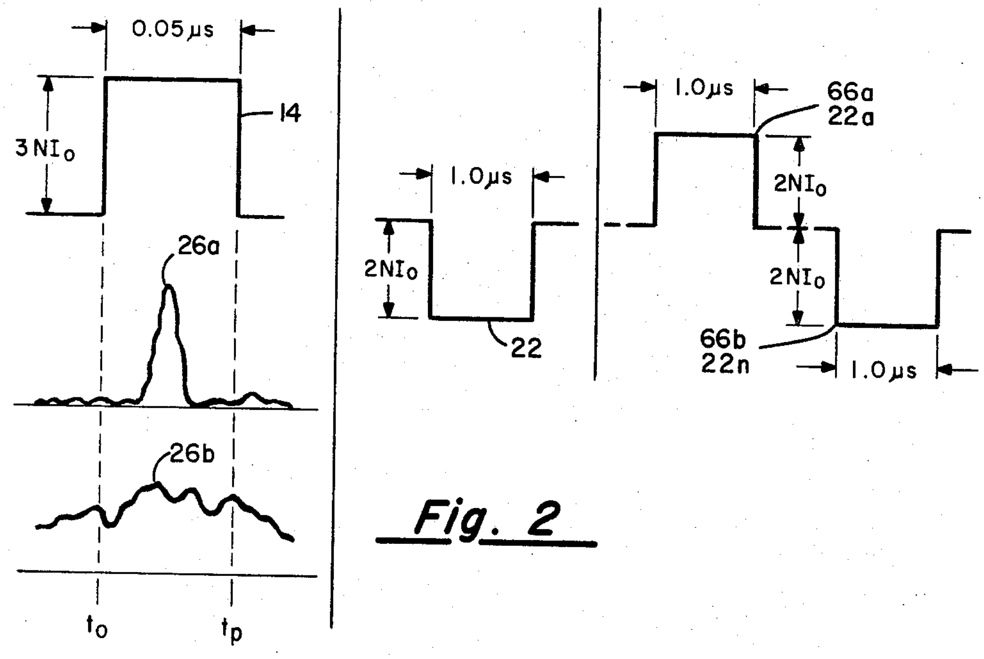
FIG. 2 is an illustration of the waveforms of the particular electrical signals associated with the circuit of FIG. 1.

With particular reference to FIGS. 1 and 2 there are illustrated a detector circuit and a set of signal waveforms that will be utilized to explain the present invention. FIG. 1 includes toroidal ferrite core 10 which has a substantially rectangular hysteresis characteristic and is capable of being operated in a time-limited or a saturated magnetic condition as a function of a magnetic field of a predetermined amplitude-duration characteristic. Strobe pulse current generator 12 couples strobe pulse 14 and clear-reset signal current generator 20 couples clear pulse 22 and a plurality of repetitive set-reset pulses 22*a*, . . . 22*n* to core 10 by way of line 16 through switch 18. Signal current source 24 couples analog signal 26 to analog input circuit 28 which includes diode 30, line 32 and resistor 34. Lastly, sense line 36 couples output signal 38, which signal is induced therein by the action of clear pulse 22 in effecting a change in the magnetization of core 10, to integrator 40 which integrator in turn couples a suitably integrated signal 42 to oscilloscope 44. Signal 42 is representative of the integral of that portion of signal 26 that is sampled over the coincident duration of strobe pulse 14.

Figure 3:
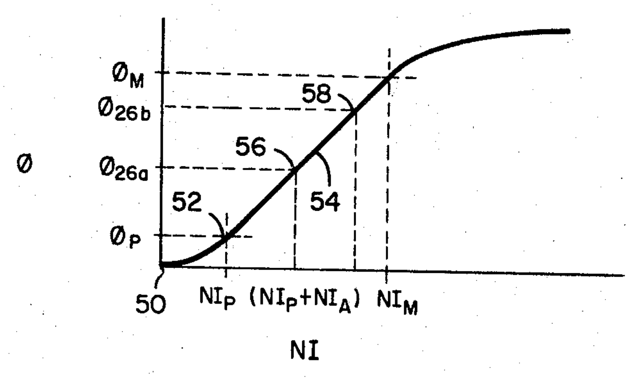
FIG. 3 is an illustration of the time-limited irreversible switching characteristic of the magnetizable memory element utilized by the present invention.

FIG. 3 is a plot of the time-limited irreversible switching characteristic of core 10 of FIG. 1 and is obtained by the application of discrete time-limited pulses of the same duration, $t_p$, but of increasing amplitude, NI. Starting with the application to core 10 of a pulse of a duration $t_p$ and of a negligible amplitude, the total irreversibly switched flux $\phi$ is plotted as a function of the effective ampere-turns NI of the applied pulse. When the amplitude of the applied pulse approaches $NI_p$ the curve becomes linear for increasing pulse amplitudes. When the applied pulse exceeds $NI_M$ the curve again become nonlinear. Accordingly, with the parameters of FIG. 1 adjusted to provide a pulse of $NI_p$ due to strobe pulse 14, the range of the linear response of the detector of FIG. 1 is that of a sampled analog signal having an integrated effective maximum amplitude of $NI_A$ where $$NI_A+NI_p=NI_M$$

and where $NI_M$ is the maximum linear range of the detector. If a second similar core 10' were coupled to line 16 in the same magnetic sense as it is to core 10 and to line 36 in the opposite magnetic sense as it is to core 10, i.e., in a buck-out mode, the strobe pulse 14 induced flux change $\phi_p$ would be cancelled in line 36 upon readout providing a difference-signal in sense line 36 whose integral is a linear function of the integral of the sampled analog signal.

THEORY OF OPERATION

Assume that core 10 is initially in a saturated counterclockwise polarized set magnetic state due to the prior application of set-reset pulse 22*a*, . . . 22*n* and that the choice of the following parameters is made to cause, by the action of strobe pulse 14 alone, the magnetization of core 10 to switch from its set state of point 50 (see FIG. 3) to point 52 of curve 54:

(a) Strobe pulse amplitude, NI
(b) Strobe pulse duration, $t_p$
(c) Forward voltage drop of diode 30
(d) Number of turns $N_1$ of line 32 about core 10, and
(e) Value of resistor 34

(a) *No analog signal condition*

With switch 18 set into position 18*s* and with no signal coupled to point 46 of analog input circuit 28 and with strobe pulse 14 coupled to line 16 at time $t_o$ by way of switch 18 the magnetization of core 10 initiates switching inducing an opposing current into line 32. This opposing current induced in line 32 builds up to forward bias diode 30 causing a current $i_1$ to flow through the forward resistance of diode 30 ($D_{30}$) and resistor 34 ($R_{34}$). The amplitude of the current $i_1$ is such that the voltage drop $e_o$ across diode 30 and resistor 34 is equal to the voltage $e_s$ generated in line 32 by the effective change of the magnetization of core 10 times the number of turns $N_1$ of line 32 about core 10, or $$e_o=i_1D_{30}+i_1R_{34}=e_sN_1$$

The voltage $e_s$ that is induced in line 32 by the change in the magnetization of core 10 is also related to the current $i_1$ as the net applied ampere-turns $NI_n$ producing the change in the magnetization of core 10 is equal to the ampere-turns $NI_{14}$ of strobe pulse 14 less the ampere-turns $N_1i_1$ of line 32, or $$NI_n=NI_{14}-N_1i_1$$

With switch 18 set into position 18*c* and with clear signal 22 coupled to line 16, core 10 is cleared, i.e., reset into its initial set state 50, causing an output signal 38 to be induced in line 36 and in turn to be coupled to in tegrator 40. Output signal 38 is the output of core 1 due to the time-limited magnetic state 52 (see FIG. 3 that is established by the conjoint action of the driv fields generated by currents flowing through lines 16 an 32 (due to strobe pulse 14 and with no signal coupled t point 46). This signal, preferably, is, as stated herein before, just sufficient to set the magnetization of core 1 at point 52 which point is the beginning of the linear por tion of curve 54.

(b) *Analog signal condition*

For the pre-recording operation the magnetization o core 10 is initially placed into its set magnetic state 5 as discussed hereinbefore and switch 18 is then place into position 18*n*. With signal source 24 then coupling positive analog signal 26 to point 46, diode 30 is revers biased causing analog signal 26 to flow through resisto 34 to ground. At this time analog signal 26 has no effec upon the magnetization of core 10. Now, if at time *t* switch 18 is placed into position 18*s* and strobe pulse 1 is coupled to core 10 by way of line 16 concurrent wit and overlapping a portion 26*a* of analog signal 26, th currents as discussed hereinabove in the no analog signa condition, will flow on lines 16 and 32. However, assum ing that analog signal 26 produces a current flow *i* (through resistor 34) at point 46 there is an effective re verse biasing action on diode 30 that is effectively in op position to the forward biasing action on diode 30 due t current $i_1$ flowing through line 32. Thus, the voltage *e* across diode 30 and resistor 34 is equal to the voltage *e* generated in line 32 by the effective change of the mag netization of core 10 times the number of turns $N_1$ o line 32 about core 10, or $$e_a=i_1D_{30}+(i_1+i_2)R_{34}=e_bN_1$$

Accordingly, it is apparent that a greater effective switch ing voltage $e_a$ must be generated. This greater switchin voltage is generated by core 10 switching faster. Sinc core 10 switches faster, the magnetization of core 10 i set into a greater time-limited flux level, such as at poin 56 (as regarding the initial set state 50), along the linea portion of curve 54 than in the no analog signal condi tion. It is apparent that if a portion of analog signal 2 having a larger integral than that of signal 26*a*, such a signal 26*b*, is coupled to point 46 concurrent with th coupling of strobe pulse 14 to line 16, the magnetizatio of core 10 would be set into a still greater time-limite flux level along the linear portion of curve 54, such as a point 58. The arrangement is such that the time-limite flux level set in core 10 is a function of the integral o that portion of the analog signal that is sampled by th strobe pulse. Accordingly, the analog signal, by its re verse biasing action on diode 30, causes a modulatin effect on the effective time-limited switching signal in ductively coupled to core 10 by lines 16 and 32.

Figure 4:
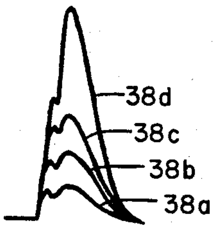
FIG. 4 illustrates a set of typical output signal waveforms from core 10 of FIG. 1 for corresponding time-limited flux levels.
Figure 5:
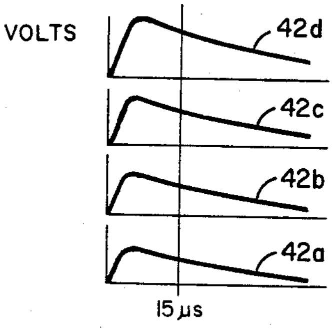
FIG. 5 illustrates a set of typical displays upon the face of the oscilloscope of FIG. 1 for the corresponding waveforms of FIG. 4.

With particular reference to FIG. 4 there are illustrate detector output signals 38*a*, 38*b*, 38*c* and 38*d* representa tive of different correspondingly higher time-limited flu levels set into core 10. Such signals when integrated b integrator 40 produced the integrator output signals 42*a* 42*b*, 42*c* and 42*d*, respectively, of FIG. 5. Upon the ob servation and calibration of signals 42*a*, 42*b*, 42*c* and 42 as displayed upon the face of oscilloscope 44 it was de termined that the amplitudes of such signals after a cer tain delay time, for example at a time 15 $\mu$s. (microsec onds) after their wavefronts, were in direct correlatio with the levels of the data stored in core 10.

Figure 6:
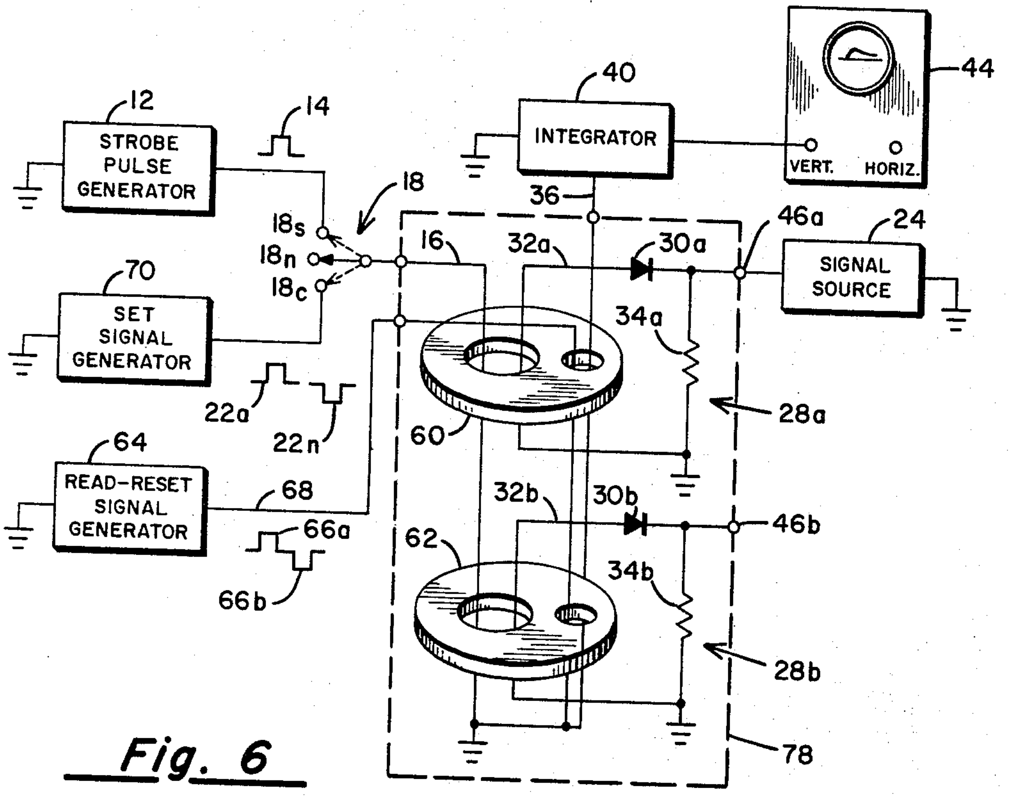
FIG. 6 is an illustration of the preferred embodiment of the present invention.

With particular reference to FIG. 6 there is illustrate a preferred embodiment of the present invention in whic the components that are common to the previously dis cussed FIG. 1 are identified by like reference numbers In the preferred embodiment the magnetizable memory nents are of the well known two aperture transfluxor n and have the same magnetic characteristics as core of FIG. 1 and as exemplified by FIG. 3. In the pre-ed embodiment of FIG. 6 there are provided two ilar transfluxor cores 60 and 62 that are arranged in 'ell known buck-out arrangement. As can be seen by inspection of FIGS. 1 and 6 core 60 is coupled to s 16, **32*a* and 36 in a manner similar to that of FIG. ıut with sense line 36 threading the small aperture :eof. Additionally, as the transfluxor is interrogated the coupling of a bipolar read-reset current signal to small aperture there is provided in the preferred em-liment a read-reset current signal generator 64 that ples opposite polarity read pulse 66*a* and reset pulse ı to the small apertures of cores 60 and 62 in the same gnetic sense by way of read line 68. Further, set cur-t signal generator 70 couples set-reset pulses 22*a* . . . ; to cores 60 and 62 in the same magnetic sense by ans of line 16. As is typical in a buck-out arrangement, ıal source 24 is coupled only to the large aperture of e 60 while sense line 36 is coupled to the small aper-es of cores 60 and 62 in an opposing magnetic sense h that if the flux levels set into cores 60 and 62 are the same level the signals induced in line 36, upon in-:ogation, generates cancelling, equal-but-opposite, out-: signals in line 36 coupling no significant output signal integrator 40**.

As is typical in transfluxor operation, cores 60 and 62 set into an additional counterclockwise magnetically arized set state by set current signal generator 70 cou-ıg set-reset pulses **22*a* . . . 22*n* to the large apertures cores 60 and 62 by way of line 16 when switch 18 is into position 18*c*. In this initial set state, both cores 60 l 62** are in an essentially saturated counterclockwise :gnetically polarized state with respect to the large ertures thereof.

As in the previously discussed arrangement of FIG. 1 en signal source 24 couples an analog signal to point ı of the analog signal input circuit **28*a* without the ıcurrent coupling of strobe pulse 14 to the large aper-es of transfluxors 60 and 62 by way of line 16, diode ı is effectively reverse biased, as respect analog signal , preventing its affecting the magnetization of core 60. e recording operation is initiated at time $t_n$ by the ıcing of switch 18 in position 18*s* enabling strobe sig-l generator 12 to couple strobe pulse 14 to the large ertures of cores 60 and 62 by way of line 16. With obe pulse 14 concurrent with and overlapping a por-n 26*a* of analog-signal 26, diode 30*a* is forward biased ereby and, as in the description of FIG. 1, there is pro-ced a flux switching about the large aperture of core whose time-limited flux level is determined by the njoint effect of strobe pulse 14 and analog signal 26*a*. owever, as regards the effecting of the magnetization of flux level about the large aperture of core 62, its ne-limited flux level is determined only by strobe pulse . Accordingly, the integrated time-limited flux level :ablished about the large aperture of core 60 may be presented by point 56 of FIG. 3 while the integrated ne-limited flux level set about the large aperture of re 62 may be represented by point 52** of FIG. 3.

Readout of the flux levels established in cores 60 and , is accomplished by signal generator 64 coupling pulse ıa to the small apertures of cores 60 and 62 by way of ıe 68. As is typical in the nondestructive readout pro-led by a transfluxor, pulse **66*a* reverses only that nount of flux about the small apertures of cores 60 and ; that was previously set into a time-limited flux level ıout the larger apertures thereof and particularly in the ea between such large and small apertures. Accordingly, ıre 60 having been affected by the combined effect on ıalog signal 26*a* and strobe pulse 14 while core 62 was fected only by strobe pulse 14 it, upon readout as fected by pulse 66*a* flowing through line 68 and coupled ı the small apertures thereof would cause to be induced in line 36 an appropriate difference-signal, due to the op-posite magnetic sense coupling of line 36, that is a func-tion of the difference between the flux levels set in cores 60 and 62. As discussed hereinabove and assuming that the integrated time-limited flux level of core 62 may be represented by point 52 of FIG. 3 and that the integrated time-limited flux level of core 60 may be represented by point 56 of FIG. 3 a difference-signal would be induced in sense line 36 by the flux change of point 56 less that of point 52, i.e., $\phi 26_a - \phi_p$. Integrator 40 couples a suit-able output signal to oscilloscope 44** that is representative of the difference-signal.

After the readout operation performed by a pulse **66*a* the flux levels about the small apertures of cores 60 and 62 are reset into a time-limited flux level corresponding to their prior recorded condition by the coupling of a pulse 66*b* to the small apertures of cores 60 and 62 by way of line 68. Pulse 66*b* is effective as respect the small apertures of cores 60 and 62 only to reestablish the pre-vious effective flux levels set about the larger apertures of such cores by the previous recording operation. This read-reset cycle performed by pulses 66*a* and 66*b* may be repeated many times without destroying the flux levels about the larger apertures of cores 60 and 62**. This non-destructive readout feature of a transfluxor is an advan-tage where repeated reading of previously stored data is required.

As previously discussed with particular reference to FIG. 1 and FIG. 2 the sampling of a relatively continuous analog signal may be effected by the preferred embodi-ment of FIG. 6 in a like manner. With particular refer-ence to signal **26*b* of FIG. 2 strobe pulse 14 performs the function of a flux gate, gating into the magnetizable memory elements only that amount of analog signal 26 that is coincident with the time-limited strobe pulse 14. In particular applications where a plurality of sampled portions of a relatively continuous analog signal are to be taken arrangements utilizing a plurality of the pre-ferred detectors 78 as exemplified in FIG. 6 may be real-ized. Such arrangements could include a plurality of de-tectors 78 wherein the analog signal source could be paral-lel or serial coupled to all of the analog signal receiving cores 60 of the array with the strobe pulse serially or parallelly coupled to all of the cores 60 and 62** of the array with suitably timed delay means between each de-tector of the array. The delay means provide proper de-lays of the strobe pulse with respect to a fixed point on the analog signal whereby each sampled portion of a predetermined train of sampled portions of the analog signal may be stored in a corresponding particular detec-tor associated therewith. Such arrangements may be simi-lar to that illustrated in the copending applications of Raymond H. James, Ser. No. 321,909, filed Nov. 6, 1963, or Lanny L. Harklau et al., Ser. No. 385,994, filed July 29, 1964, said copending applications assigned to the same assignee as is the present application.

It is understood that suitable modifications may be made in the structure as disclosed provided such modifica-tions come within the spirit and scope of the appended claims. Having now, therefore, fully illustrated and de-scribed our invention, what we claim to be new and de-sire to protect by Letters Patent is set forth in the ap-pended claims.

What is claimed is:

1. A magnetic integrator comprising:

a magnetizable element having a substantially rectangu-lar hysteresis characteristic and being capable of be-ing operated in a time-limited, an amplitude limited or a saturated magnetic condition as a function of a magnetic field of a predetermined amplitude duration characteristic;

strobe means for inductively coupling a time-limited strobe pulse to said element for setting the magnetiza-tion of said element into a first time-limited flux level;

input circuit means for inductively coupling an analog signal to said element;

said strobe pulse concurrent with said analog signal;

said input circuit means including a diode poled to be forward biased by a switching signal that is generated in said input circuit means by the change of magnetization of said element that is caused by said strobe pulse;

said analog signal of a polarity with respect to said switching signal that tends to reverse bias said diode;

a variation in the amplitude of said analog signal causing a corresponding variation in said switching signal;

said corresponding variation in said switching signal causing a corresponding variation in the time-limited flux level of said element from said first time-limited flux level;

means inductively coupling a read signal to said element;

means inductively coupled to said element wherein upon the coupling of said read signal to said element there is induced therein a signal whose integral is representative of the integral of said analog signal that is concurrent with said strobe pulse.

2. A magnetic integrator comprising:

a magnetizable element having a substantially rectangular hysteresis characteristic and being capable of being operated in a time-limited, an amplitude limited or a saturated magnetic condition as a function of a magnetic field of a predetermined amplitude duration characteristic;

clear means for inductively coupling a saturating clear signal to said element for setting the magnetization of said element into a first saturated state;

strobe means for inductively coupling a time-limited strobe pulse to said element for changing the magnetization of said element to a first time-limited flux level from said first saturated state;

input circuit means for inductively coupling an analog signal to said element;

said strobe pulse concurrent with said analog signal;

said input circuit means including a parallel arranged diode and resistor, both coupled to ground;

said diode poled to be forward biased by a switching signal that is generated in said input circuit means by the change of magnetization of said element that is caused by said strobe pulse;

said analog signal of a polarity with respect to said switching signal that tends to reverse bias said diode;

a variation in the amplitude of said analog signal causing a corresponding modulation of said switching signal;

said corresponding modulation of said switching signal causing a corresponding variation in the partially switched time-limited flux level of said element from said first time-limited flux level;

means inductively coupling a saturating read signal to said element for setting the magnetization of said element back into said first saturated state;

means inductively coupled to said element wherein upon the coupling of said read signal to said element there is induced therein a signal whose integral is representative of the integral of said analog signal that is concurrent with said strobe pulse.

3. A magnetic integrator comprising:

a transfluxor type magnetizable core having first and second apertures therethrough each aperture defining first high and second low reluctance flux paths thereabout, respectively, and each flux path having a substantially rectangular hysteresis characteristic and being capable of being operated in a time-limited, an amplitude limited or a saturated magnetic condition as a function of a magnetic field of a predetermined amplitude duration characteristics;

means for inductively coupling a clear signal to said first aperture;

strobe means for inductively coupling a time-limited strobe pulse to said first aperture for changing the magnetization about said second aperture to a first time-limited flux level;

input circuit means for inductively coupling an analog signal to said first aperture;

said strobe pulse concurrent with a sampled portion of said analog signal;

said input circuit means including a diode poled to be forward biased by a switching signal that is induced in said input circuit means by the change of magnetization of said first flux path that is caused by said strobe pulse;

said analog signal of a polarity with respect to said switching signal tending to reverse bias said diode;

a variation in the amplitude of said analog signal causing a corresponding modulation of the amplitude of said switching signal;

said corresponding modulation of the amplitude of said switching signal causing a corresponding variation of the time-limited flux level in said second flux path different from said first time-limited flux level;

means inductively coupling a read signal to said second aperture;

means inductively coupled to said second aperture wherein upon the coupling of said read signal to said second aperture a signal is induced therein whose integral is representative of the integral of said analog signal sampled portion.

4. A magnetic integrator comprising:

a transfluxor type magnetizable core having first and second apertures therethrough defining first high and second low reluctance flux paths thereabout, respectively, and each flux path having a substantially rectangular hysteresis characteristic and being capable of being operated in a time-limited, an amplitude limited or a saturated magnetic condition as a function of a magnetic field of a predetermined amplitude-duration characteristic;

means for inductively coupling a saturating clear signal to said first aperture for setting the magnetization about said first aperture into a first saturated state;

strobe means for inductively coupling a time-limited strobe pulse to said first aperture for changing the magnetization about said first aperture to a first time-limited flux level from said first saturated state;

input circuit means for inductively coupling an analog signal to said first aperture;

said stroke pulse concurrent with said analog signal;

said input circuit means including a diode poled to be forward biased by a switching signal that is generated in said input circuit means by the change of magnetization of said first flux path that is caused by said strobe pulse;

said analog signal of a polarity with respect to said switching signal tending to reverse bias said diode;

a variation in the amplitude of said analog signal causing a corresponding variation in said switching signal;

said corresponding variation in said switching signal causing a corresponding variation in the time-limited flux level in said first flux path different from said first time-limited flux level;

means inductively coupling a saturating read signal to said second aperture;

means inductively coupled to said second aperture wherein upon the coupling of said read signal to said second aperture a signal is induced therein whose integral is representative of the integral of said analog signal that is concurrent with said strobe pulse.

5. A magnetic integrator comprising:

first and second substantially similar magnetizable transfluxor type cores each having a substantially rectangular hysteresis characteristic and being capable of being operated in a time-limited, an amplitude limited or a saturated magnetic condition as a function of a magnetic field of a predetermined amplitude duration characteristic;

aid first and second cores each having first and second apertures therethrough;

irst and second magnetic flux paths defined by the peripheries of said first and second apertures, wherein the effective reluctance of said first path is substantially larger than that of said second path;

lear means coupling the high reluctance paths fo said first and second cores for inductively coupling in a first magnetic sense a clear signal having a saturating amplitude-duration characteristic for setting the flux about said high reluctance path into a first substantially saturated state;

nput circuit means coupling an analog signal to the first aperture of only said first core;

strobe means for inductively coupling a time-limited strobe pulse to said first and second core's first apertures for setting the magnetization about said first apertures into a first time-limited flux level;

said strobe pulse concurrent with said analog signal;

said input circuit means including a diode poled to be forward biased by a switching signal that is generated in said input circuit means by the change of magnetization of said first core's first flux path that is caused by said strobe pulse;

said analog signal of a polarity with respect to said switching signal tending to reverse bias said diode;

a variation in the amplitude of said analog signal causing a corresponding variation in said switching signal;

said corresponding variation in said switching signal causing a corresponding variation in the time-limited flux level of said first core's first flux path that is caused by said strobe pulse;

output means coupling the second apertures of said first and second cores in opposite magnetic senses;

read means coupling a saturating read signal to the second apertures of said first and second cores in the same magnetic sense for causing the flux in said second flux paths to be switched into a read condition for causing an output signal to be induced in said output means wherein said output signal's integral is representative of the integral of said analog signal that is concurrent with said strobe pulse.

6. A magnetic integrator comprising:

first and second substantially similar magnetizable transfluxor type cores each having a substantially rectangular hysteresis characteristic and being capable of being operated in a time-limited, an amplitude limited or a saturated magnetic condition as a function of a magnetic field of a predetermined amplitude duration characteristic;

said first and second cores each having first and second apertures therethrough;

first and second magnetic flux paths defined by the peripheries of said first and second apertures, wherein the effective reluctance of said first path is substantially larger than that of said second path;

clear means coupling a saturating clear signal to the first apertures of said first and second cores for setting the flux in said first flux paths into a first substantially saturated state;

input circuit means coupling an analog signal to the first aperture of only said first core;

strobe means for inductively coupling a time-limited strobe pulse to the first apertures of said first and second cores for changing the magnetization of said first flux paths into a first time-limited flux level from said first saturated state;

said strobe pulse concurrent with a sampled portion of said analog signal;

said input circuit means including a diode poled to be forward biased by a switching signal that is generated in said input circuit means by the change of magnetization of said first core's first flux path that is caused by said strobe pulse;

said analog signal of a polarity with respect to said switching signal tending to reverse bias said diode;

a variation in the amplitude of said analog signal causing a corresponding variation in said switching signal;

said corresponding variation in said switching signal causing a corresponding variation in the time-limited flux level of said first core's first flux path that is caused by said strobe pulse;

output means coupling the second apertures of said first and second cores in opposite magnetic senses;

read means coupling a saturating read signal to the second apertures of said first and second cores in the same magnetic sense for causing the flux in said second flux paths to be switched into a read condition for causing an output signal to be induced in said output means wherein said output signal's integral is representative of the integral of said analog signal sampled portion.

7. A magnetic integrator comprising:

first and second substantially similar magnetizable transfluxor type cores each having a substantially rectangular hysteresis characteristic and being capable of being operated in a time-limited, an amplitude limited or a saturated magnetic condition as a function of a magnetic field of a predetermined amplitude duration characteristic;

said first and second cores each having first and second apertures therethrough;

first and second magnetic flux paths defined by the peripheries of said first and second apertures, wherein the effective reluctance of said first path is substantially larger than that of said second path;

clear means coupling the first apertures of said first and second cores for inductively coupling in a first magnetic sense a clear signal having a saturating amplitude duration characteristic for setting the flux about said first apertures into a first substantially saturated magnetic condition;

input circuit means coupled to only the first aperture of only said first core for inductively coupling an analog signal thereto;

strobe means for inductively coupling a time-limited strobe pulse to said first and second core's first apertures for changing the magnetization about said core's first and second apertures to corresponding first time-limited flux levels;

said strobe pulse concurrent with said analog signal;

said input circuit means including a diode poled to be forward biased by a switching signal that is induced in said input circuit means by the change of magnetization of said first core's first high reluctance flux path that is caused by said strobe pulse;

said analog signal of a polarity with respect to said switching signal tending to reverse bias said diode;

a variation in the amplitude of said analog signal causing a corresponding modulation of said switching signal;

said corresponding modulation of said switching signal causing a corresponding variation in the partially switch time-limited flux level of said first core's second low reluctance flux path that is caused by said strobe pulse;

output means coupling the second apertures of said first and second cores in opposite magnetic senses;

read means coupling a read signal having a saturating amplitude-duration characteristic to the second apertures of said first and second cores in the same magnetic sense for causing the flux about said second apertures to be switching into a read condition for causing an output signal to be induced in said output means wherein said output signal's integral is representative of the integral of said analog signal that is concurrent with said strobe pulse.

References Cited

UNITED STATES PATENTS

| | | | |
|---|---|---|---|
| 3,015,809 | 1/1962 | Myers | 340—174 |
| 3,278,912 | 10/1966 | Vinal et al. | 340—174 |

OTHER REFERENCES

Core Characteristics Indicator, IBM Technical Discl sure Bulletin by J. L. Center et al., vol. 2, No. 4, Decer ber 1959, #152, p. 139.

BERNARD KONICK, *Primary Examiner.*

S. URYNOWICZ, *Assistant Examiner.*